United States Patent [19]

Gray

[11] Patent Number: 4,892,790

[45] Date of Patent: Jan. 9, 1990

[54] OXIDATION-INHIBITED CARBONOUS MATERIALS

[75] Inventor: Paul E. Gray, San Diego, Calif.

[73] Assignee: General Atomics, San Diego, Calif.

[21] Appl. No.: 805,887

[22] Filed: Dec. 6, 1985

Related U.S. Application Data

[63] Continuation of Ser. No. 798,994, Nov. 18, 1985, which is a continuation-in-part of Ser. No. 676,985, Nov. 30, 1984.

[51] Int. Cl.$^4$ ............................................... B22F 7/01
[52] U.S. Cl. .................................... 428/548; 428/554; 428/557; 428/149; 428/408
[58] Field of Search .............. 428/149, 107, 408, 548, 428/554, 557

[56] References Cited

U.S. PATENT DOCUMENTS

| 4,101,354 | 7/1978 | Shaffer | 156/60 |
| 4,321,298 | 3/1982 | Shaffer et al. | 428/242 |
| 4,439,382 | 3/1984 | Joo et al. | 264/29.5 |
| 4,515,847 | 5/1985 | Taverna et al. | 428/107 |

Primary Examiner—Peter A. Nelson

Attorney, Agent, or Firm—Fitch, Even, Tabin & Flannery

[57] ABSTRACT

Composites comprising high-temperature fibers reinforcing a carbonous matrix are protected from oxidation by a $B_2O_3$-based glass which includes a refractory oxide to stabilize the viscosity of the glass. Precursors of $B_2O_3$ and the refractory oxide are dispersed into a carbon char-yielding material; the material is used to impregnate sheets of fibers; the sheets are laid up as plies; and the laid-up plies are carbonized and graphitized using heat and pressure to form a composite structure. The composite structure is then coated with an additional mix of char-yielding material and precursors, and the coated structure is heated to carbonize the material and leave a seal coat on the structure. Then, an outer coating of a refractory material is deposited on the structure. Oxygen which seeps through the seal coat is initially scavenged at high temperatures by the RO and $B_2O_3$ precursors, converting the same to a $B_2O_3$-RO glass which protects both the internal pore surfaces of the composite as well as the outer structural surfaces from oxidation.

10 Claims, 2 Drawing Sheets

FIG. 4.

OXIDATION-INHIBITED CARBONOUS MATERIALS

This application is a Continuation of U.S. patent application Ser. No. 798,994, filed Nov. 18, 1985, which is a Continuation-In-Part of U.S. patent application Ser. No. 676,985 filed Nov. 30, 1984.

The present invention relates to carbonous structural materials, including carbonous composites, which are formed and treated so as to resist oxidation even in high-temperature, oxidizing environments.

BACKGROUND OF THE INVENTION

It is known to form a structural material by heating a carbon char-yielding material to carbonize the same. Of particular interest are composites which include a carbonous matrix formed by carbonization of a carbon char-yielding material and reinforcing fibers.

Carbon-carbon composites, for example, are tough, strong, lightweight materials that are useful as structural material in applications where strength to weight ratio is important. Carbon-carbon composites incorporate carbon (including graphite) fibers in a carbon matrix so as to reinforce the matrix. Carbon-carbon composites may be formed, for example, by impregnating graphite cloth with a carbon char-yielding material, layering plies of the impregnated graphite cloth and then carbonizing the impregnated layered plies with the application of heat and pressure.

An important limitation to the use of carbonized structural materials is their susceptibility to oxidation in high-temperature, oxidizing environments. Oxygen not only attacks the surface of carbonized material but seeps into the pores or interstices that invariably are present, oxidizing the surfaces of the pores and continuously weakening the material. In the case of composite structural materials, where the carbonized and/or graphitized matrix is reinforced with fibers, oxidizing atmosphere reaching the fibers may oxidize the fibers themselves, thereby seriously weakening the composite structure. Carbon and graphite fibers, for example, are rapidly degraded at high temperatures in the present of oxygen.

If carbonized structural materials could be rendered resistant to oxidation at high temperatures, e.g., above about 500° C., and still retain their desirable high-temperature stability and mechanical properties, their usefulness would be significantly enhanced, e.g., in systems, such as heat engines and rockets, where high-strength, lightweight, oxidation-resistant components are required to operate for long time periods under high stresses generated by thermal cycling. Accordingly, it is a general object of the present invention to provide carbonous structural materials, including fiber-reinforced composites that have improved resistance to oxidation.

SUMMARY OF THE INVENTION

Oxidation-inhibited carbonous structural materials are formed which are protected at their internal pore surfaces, their outer structural surfaces, or both, by boron and a metal or metalloid which oxidize in a high-temperature, oxidizing environment to form a sealant of viscosity-stabilized boron oxide-based glass. The metal or metalloid refractory oxide that forms is partially soluble in boron oxide and stabilizes the viscosity of boron oxide in its molten state at high temperatures so that the boron oxide-based glass retains sufficient viscosity to seal the surfaces and thereby protect the surfaces from oxidation.

To form an oxidation-resistant structural material, a precursor of boron oxide plus a precursor of a refractory oxide, i.e., a metal oxide or a metalloid oxide, are co-dispersed in a carbon char-yielding material, and the dispersion is formed into a three-dimensional structure. The three-dimensional structure is heated to carbonize the carbon char-yielding material, thereby forming a carbonous structural material having boron and metal or metalloid dispersed throughout a carbonous matrix. Preferably, the structural material is further heated to graphitize and/or stabilize the matrix to further changes in use.

To form a composite structure, the dispersion of boron and metal or metalloid in carbon char-yielding material is used to impregnate or coat the reinforcing high-temperature fibers, i.e., fibers which are either stable at high temperature or which are transformed to a material that is stable at high temperatures as the matrix is carbonized and/or graphitized. For example, a dispersion is impregnated into reinforcing fibers assembled as layers to form plies; the plies are layered into a three-dimensional form, and the layered plies are carbonized to form composite structural material having a carbonous matrix that is reinforced by the fibers.

An outer seal coat is preferably formed on the outer surfaces of the high-temperature structural material by coating the material with a dispersion of the boron oxide precursor (boron in elemental form or as a moiety of a compound) and the refractory oxide precursor (a metal or metalloid in elemental form or as a moiety of a compound) in a carbon char-yielding material and then carbonizing the surface-applied dispersion. The seal coat provides additional oxidation-resistance to the outer surfaces of the structure in that the boron oxidizes to form boron oxide in a high-temperature oxidizing environment and the metal or metalloid oxidizes to form a refractory oxide which is partially soluble in boron oxide and stabilizes the viscosity of the molten phase of the boron oxide. Preferably, both boron and a metal or a metalloid are dispersed throughout the carbonous matrix and further applied to the surface as a seal coat.

To further protect the structural material from oxidation at high temperatures, it is preferred to place a hard outer refractory coating, such as a layer of silicon, silicon carbide, silicon nitride, aluminum nitride, or silicon boride over the composite material.

The intermediate seal cot helps to accommodate differential thermal expansion between the refractory outer coating and the structural material, while at the same time providing a source of sealing, boron oxide-based glass to close any cracks in the outer refractory coating which may exist.

The matrix and the seal coat initially each include boron plus a metal or a metalloid, with the boron existing as elemental boron or a moiety of a boride or carbide and the metal or metalloid existing in elemental form or as a moiety of a boride or a carbide. However, in a high-temperature, oxidizing atmosphere, the boron and metal or metalloid scavenge oxygen to form the oxides, thus forming a sealing, boron oxide-based glass. The oxides occupy a substantially larger volume than do the precursors, and if the boron and metal or metalloid within the pores are oxidized, they expand to fill pores or interstices and thereby cover the interior pore surfaces. Molten boron oxide-based glass is viscosity-stabilized by the presence of the refractory oxide, and the viscosity-stabilized glass coats the pore surfaces. The boron oxide-based glass also wets the surfaces of reinforcing fibers within a composite, acting as a barrier to oxidation of the fibers. Also, the glass of the seal coat is present and available to flow into and fill cracks which initially form or later develop in the outer refractory coating. The stabilized viscosity of the boron oxide-based glass of the seal coat prevents it from simply oozing out these cracks. The dissolution of the refractory oxide in the boron oxide also deters vaporization of boron oxide at the outer surface of the refractory shell.

In a preferred embodiment, silicon is added along with boron plus a second metal or metalloid so that the glass formed is a borosilicate glass that is viscosity levelled by the oxide of the second metal or metalloid. The use of a borosilicate glass-based sealant reduces the activity of boron oxide, resulting in lower vaporation rates. It also results in reduced susceptibility to dissolution by water and corrosion by water vapor.

DETAILED DESCRIPTION OF THE PREFERRED EMBODIMENTS

In accordance with the present invention, structural materials, such as composite structures 10 (FIG. 1), in which high temperature fibers 12 reinforce carbonous matrices 13, are protected from oxidation at their internal pore surfaces and/or at their outer structural surfaces by mixtures of boron and a metal or a metalloid. The boron content, if exposed to an oxidizing environment at high temperatures, ultimately oxidizes to form boron oxide, which, in turn, fuses to a surface-protecting glass at high temperatures. A metal or metalloid is also included along with the boron in the matrix, and the metal or metalloid, in the presence of an oxidizing, high-temperature environment, oxidizes to a refractory oxide (RO), i.e., a metal oxide or a metalloid oxide. The refractory oxide dissolves in the molten boron oxide ($B_2O_3$) glass to an extent that is a function of temperature. This assures that, within a certain temperature range, the molten phase of the boron oxide-based glass has sufficient viscosity to protect surfaces of the structure from oxidation.

Boron and metal or metalloid which are dispersed throughout the matrix may eventually form a viscosity-stabilized glass on both internal pore surfaces and on external structural surfaces of the material.

Figures 1, 2, 3:
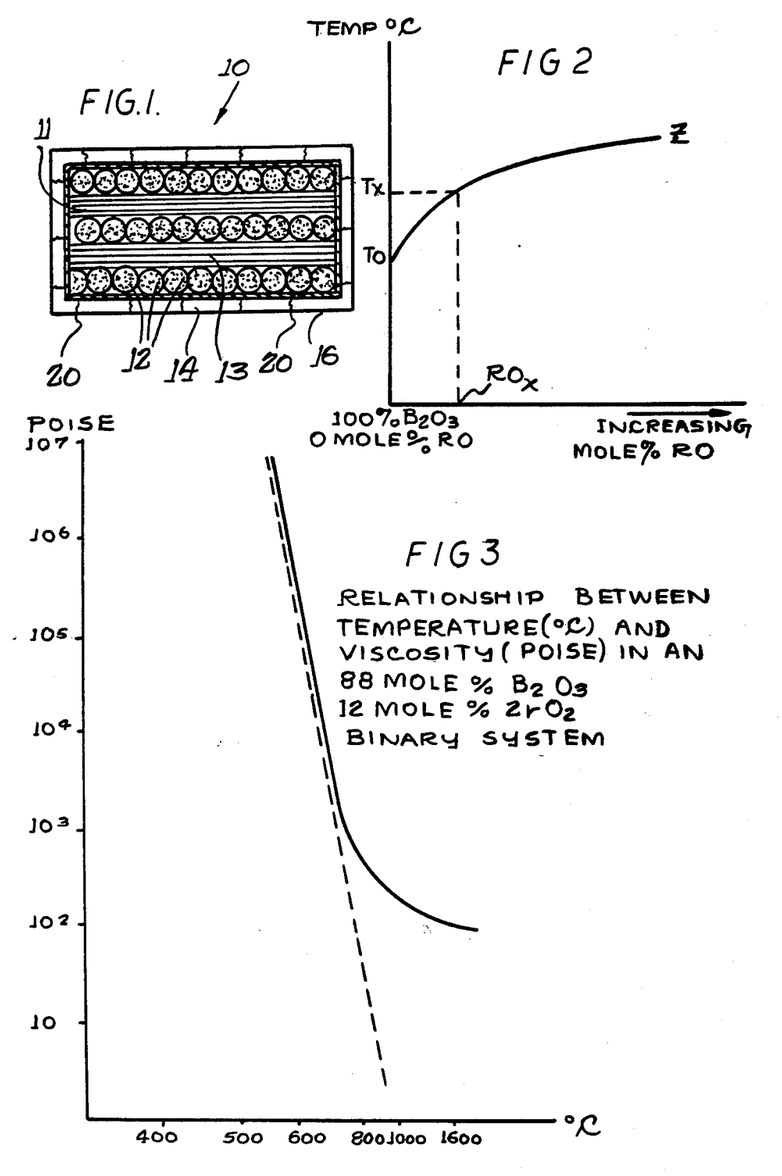
FIG. 1 is a diagrammatic representation of a composite structure, embodying various features of the present invention.
FIG. 2 is an idealized graphic representation of the relationship between solubility of a refractory oxide in molten boron oxide with temperature in several boron oxide-refractory oxide binary system.
FIG. 3 is a semi-log graph showing a viscosity leveling effect of $ZrO_2$ on $B_2O_3$ glass, with viscosity in poise being shown on the logarithmic abscissa and temperature in °C. being on the ordinate, with the temperature scale being linear with respect to reciprocal temperature.

A mixture of boron and a metal or metalloid may be applied as a seal coat 14 on the outer structural surfaces of an oxygen-susceptible material to protect the outer structural surfaces from oxidation. Preferably, the structure is further covered by an outer coating 16 of hard refractory material, in which case, molten boron oxide-based glass which forms in the seal coat 14 is available to fill in cracks that develop in the outer coating.

In order to coat the surfaces of pores or interstices that invariably develop in the carbonous structure when the structure is formed, precursors of the boron oxide and the refractory oxide are used to fill the carbon char-yielding material from which the carbonous matrix forms. Precursors may be any materials that provide boron and the metal or metalloid in correct proportions but do not introduce extraneous cations or anions that remain in the carbonous matrix that is formed. Precursors are preferably selected from elemental boron, elemental metals, elemental metalloids, metal borides, metalloid borides, metal carbides and metalloid carbides, metal nitrides, metalloid nitrides, boron carbide and boron nitride in proportions to provide the desired ratio of $B_2O_3$ and refractory oxide. When carbides and nitrides are used, there is an acceptable, but undersirable, evolution of gases. It is more preferred to use a combination of materials that do not evolve gases, such as metallic boron plus a metal boride or a metalloid boride. In the case of forming a composite material where the fiber 12 that is used for reinforcing the carbonous matrix is reactive with the metal or metalloid, the metal or metalloid are not added to the carbon char-yielding material in elemental form but rather as a boride and/or as a carbide and/or as a nitride.

The amounts of precursors added to matrix-forming carbon char-yielding material are such that subsequent to carbonization of the material, the boron and the metal or metalloid, calculated as if in their fully oxidized forms, comprise between about 10 and about 1000 weight percent and preferably between about 100 and about 1000 weight percent of the carbon in the matrix, with the metal or metalloid, calculated as the corresponding refractory oxide, being present in amounts of from about 3 to about 25 mole percent of the boron, calculated as boron oxide, and preferably from about 5 to about 20 mole percent of the boron calculated as oxide. In calculating the amount of precursors to be dispersed in the carbon char-yielding material, it may be assumed that between about 50% and about 70% of the entire carbon content of the material solids (excluding volatile solvents) yields carbon char to form the carbonous matrix, and the amount of boron oxide and refractory oxide precursors to be added to the carbon char-yielding material is calculated relative to the carbon content or yield of the material to achieve a desired ratio of $B_2O_3$, RO and carbon in the matrix, assuming eventual oxidation of the precursors. If any part of the metal or metalloid is added as a carbide, the carbon content of the carbide must also be added to the carbon content of the carbon char-yielding material in any calculations of percursor material for dispersing in the char-yielding material.

The amount of boron-, metal- and metalloid-containing fillers that are dispersed in the char-yielding material that is carbonized to form the matrix is predetermined according to the proportions of carbon, boron and metal or metalloid which the matrix is to contain.

Although the relative proportions needed to provide a matrix of desired composition can be roughly calculated according to proportions of the elements in the precarbonized dispersion and the expected loss of the elements in the carbonization step, the loss of the various elements during the carbonization step will vary according to the particular starting material used and the conditions of carbonization. Thus the actual proportions of starting materials needed to provide a matrix of desired composition must be adjusted according to actual experience.

Typically, depending upon the particular carbon char-yielding material that is used and the particular metal or metalloid that is included with the boron as a dispersion in the material to ultimately form the $B_2O_3$-RO binary system, the dispersion (of precursors in carbon char-yielding material) contains the metal or metalloid, in elemental form and/or as a moiety of a boride, carbide or nitride, at between about 15 and about 100 weight percent and preferably between about 20 and about 40 weight percent of the char-yielding material, and the mixture contains boron, in either elemental form and/or as a moiety of a compound, at between about 5 and about 140 weight percent and preferably between about 40 and about 80 weight percent of the char-yielding material.

The structure which initially forms through carbonization of the char-yielding material contains boron at between about 3 and about 300 weight percent of the carbon content of the carbonous matrix and contains the metal or metalloid at between about 5 and about 200 weight percent of the carbon content of the carbonous matrix.

The carbon char-yielding material used to form the carbonized matrix may be thermosetting or thermoplastic, depending upon the specific fabrication processing employed. The only requirement is a carbon char yield sufficient to contain the oxide precursors and produce a body of the required integrity. Examples of appropriate carbon char-yielding materials are phenolic, epoxy, furan and polyimide resins, and pitches, pitch derivatives and individual pitch constituents.

For some purposes where relatively low strength is required, a structural material having only a matrix of carbonized or carbonized and graphatized char-yielding material plus the oxidation-inhibiting boron and metal or metalloid may be used. Such a structure having a seal coat and a outer refractory coating would be represented as the composite structure shown in FIG. 1, but without the reinforcing fibers. For most purposes, however, it is preferred that the structural material be a composite, incorporating reinforcing fibers that are stable at the high temperatures to which the structural material is expected to be exposed, because such reinforcing, high-temperature fibers very substantially add to the strength of the structural material.

Reinforcing, high-temperature fibers 12 may be formed of a variety of materials, including carbon, metal or metalloid carbides, metal or metalloid borides and metal or metalloid nitrides. Particularly suitable fibers include carbon (and graphite), silicon carbide, silicon nitride, zirconium carbide, hafnium carbide, and tantalum carbide. Mixtures of fibers, such as carbon fibers plus tantalum carbide fibers and carbon fibers plus silicon carbide fibers are also suitable. The fiber(s) is- (are) selected according to factors, such as the increased strength afforded by reinforcing the carbonous matrix and the chemical environment to which the structure may be exposed. If the fiber contains a cation, the fiber should be selected for chemical stability with the refractory oxide, and to this end, it is preferred that the metal or metalloid that acts as the cation in the fiber be identical to the metal or metalloid incorporated into the matrix.

In order that a composite material retain the high strength afforded by the fibers, it is important that the fibers not be degraded, e.g., through oxidation or other chemical attack. Some of the fibers that are most commonly used in composites, such as carbon fibers, are rapidly degraded by oxidation in high-temperature, oxidizing environments. In the case of such oxidizable fibers which are otherwise stable at high temperatures, the inclusion of boron and a metal or metalloid in or on the structure further preserves the composite structure by forming boron oxide-based glass that wets and protects the fibers from oxidation. Other high-temperature fibers, such as silicon carbide fibers, are relatively resistant to oxidation, even in high-temperature, oxidizing environments, and if such fibers are used, the main function of the boron and metal or metalloid is to protect the carbonous matrix from oxidation.

The most common fiber for use in high-temperature composites is carbon, including graphite. Reinforcing carbon fibers may be either pre-formed carbon or graphite fibers or may be fibers of a material, such as polyacrylonitrile, rayon or pitch, that carbonizes when subjected to high temperatures.

Reinforcing, high-temperature fibers are incorporated in a composite arranged in a manner that adequately reinforces the carbonous matrix. Fibers may be woven into sheets, forming a cloth or may be individual fibers, e.g., whiskers, arranged in a manner, such as non-woven fabric or mat, so as to best reinforce the composite for the purpose it is intended to serve. A multidirectional array of continuous fibers may also be used to enhance reinforcement. In the composite that is formed, the fibers generally comprise between about 40 and about 70 weight percent of the carbonous matrix material of the composite; however, this may vary somewhat depending on the chemical composition of the particular fiber used.

Although oxidation protection is described herein in terms of a boron-oxide glass which is viscosity-stabilized due to the presence of a refractory oxide, the matrix material that is initially formed after carbonization of the char-yielding material contains substantially no boron oxide or refractory oxide. Rather, the carbonized matrix material contains boron and the metal or metalloid in various forms, from which the boron oxide and refractory oxide may eventually form. Boron oxide and refractory oxides themselves are not incorporated as fillers in the carbon char-yielding material that is to be carbonized to form the matrix because the oxygen moieties of such oxides would tend to oxidize carbon, and possibly the fibers, during carbonization of the char-yielding material. Rather, useful filler materials include elemental boron, metal boride, metalloid boride, metal carbide, metalloid carbide, metal nitride, metalloid nitride, boron carbide and boron nitride. Elemental metal or metalloid are also useful as fillers, but only if the material does not contain reinforcing fiber or if the material contains a reinforcing fiber that does not react appreciably with the elemental metal or metalloid. If the desired ratio of boron to metal or metalloid permit, according to the stoichiometric ratios of boron and the metal or metalloid in the particular boride, a mixture of elemental boron plus the metal boride or metalloid boride may be used as fillers. If a higher proportion of the metal or metalloid is required in the structure, a mixture of the metal boride or the metalloid boride plus the metal carbide or the metalloid carbide are useful as the filler.

At high temperatures, elemental boron may react with carbon, such as the carbon of carbon fibers. Accordingly, if a composite is to be formed using reinforcing carbon (or graphite) fibers and is to be heat-treated or eventually exposed to highly elevated temperatures, it is advantageous to provide the boron in the char-yielding material as boron carbide.

The boron exists in the carbonous matrix primarily as elemental boron or as a boride. The metal or metalloid exists in the carbonized matrix primarily as a boride or carbide. Nitrides of boron and the metal or metalloid may also be present to some extent. The matrix material formed with fillers according to the invention, therefore, is a refractory material that includes a variety of species, including boron, carbon, boron nitride and metal or metalloid carbides, metal or metalloid borides and metal or metalloid nitrides. The composition of the matrix changes if and when various species within the matrix are oxidized. It is intended that little or no oxidizing atmosphere ever reach the interstices of the matrix, particularly if the matrix is coated with a seal coat and with an outer refractory coating. However, should the internal regions of the matrix become exposed to a high-temperature, oxidizing environment, for example, due to chipping away of the outer refractory coating, the boron and metal or metalloid moieties within the matrix material are available for forming the viscosity-stabilized boron oxide-based glass.

The initial protection afforded to the matrix and fibers by the boron and metal or metalloid moieties within the matrix is scavenging oxygen that would otherwise oxidize the carbon in the matrix or oxidize reinforcing fibers. After the boron and metal or metalloid are oxidized, protection against further oxidation is afforded by the coating of the boron oxide-based glass on surfaces.

Importantly for providing oxidation protection, the $B_2O_3$ and RO each occupy substantially more volume, typically by a factor of about 3, than do the precursor boron and metal or metalloid moieties, and thus oxidation of the precursor moieties within any pore of the carbonized matrix swells the filler material volume so that substantially all of the pore volume becomes occupied by an $B_2O_3$-RO binary glass system.

To form an oxidation-resistant structural material in a method according to the invention, the carbon char-yielding material is formed into a three-dimensional structure. Then the three-dimensional structure is heated to carbonize the carbon char-yielding material and form the matrix. Preferably the structure is further heated to graphitize and/or stabilize the carbonous matrix.

In forming composite materials, the fibers may be the basis for forming the three-dimensional structure. In a typical composite-forming procedure, plies are formed from sheets or layers of fibers by impregnating the sheets with a carbon char-yielding material, such as a phenolic resin, that has been pre-mixed with the fillers. The plies are then layered and pressed together. Subsequently, the layered plies are heated, first to carbonize the resinous material and then at higher temperatures to graphitize and/or stabilize the same. At this time, the composite structure may be further shaped, e.g., by machining.

In some cases, the structural material which is initially formed is more porous than is desired. The structural material can be made less porous by impregnating the initially-formed structure with additional char-yielding material and repeating the carbonization and graphitization steps. The impregnating material may or may not contain additional fillers, depending upon the amount of the fillers used to form the original composite material.

To provide additional protection against oxidation, the outer surface of the structure is then coated with the seal coat 14. As a preferred means of forming the seal coat, fillers, such as are described above, are mixed with a carbon char-yielding material, and the mixture is applied over the outer surfaces of the composite structure 10. For forming the seal coat, the $B_2O_3$ and RO precursors comprise a similar or greater proportion of the dispersion than was used in the matrix-forming dispersion. Again, the metal or metalloid, in either elemental, boride, carbide or nitride form, is provided in an amount so as to be present in the seal coat, calculated as RO, from about 3 to about 25 mole percent of the boron, calculated as $B_2O_3$, and preferably between about 5 and about 20 mole percent. Because the fillers in the seal coat have much less contact with any reinforcing fibers within the matrix than the matrix material itself, there is less reason to avoid the use of elemental metal or metalloid as a filler than in the matrix-forming resin. However typically, the fillers used in the seal coat-forming dispersion are the same and are used in the same proportion relative to each other as are used in the matrix-forming dispersion.

Depending upon the char-yielding material that is used and the particular metal or metalloid that is included with the boron to ultimately form the $B_2O_3$-RO binary system in the seal coat, the mixture of char-yielding material and precursor fillers contains the metal or metalloid, in either elemental form and/or as a moiety of a boride, a carbide or a nitride at between about 15 and about 200 weight percent of the char-yielding material and boron, in either elemental and/or as a moiety of the boride, at between about 5 and about 300 weight percent of the char-yielding material.

The seal coat 14 should contain sufficient $B_2O_3$ and RO precursors so that the $B_2O_3$-RO glass may ultimately form to cover the entire outer structural surface and to seal all surface pores. The seal coat initially formed over the structural surface, before oxidation of the precursors, is preferably about 50 microns thick and may be up to about 250 microns thick.

To apply the seal coat to the carbonous structure, a slurry technique may be used. The precursors for the $B_2O_3$-RO glass are slurried in a char-yielding material that has been diluted in a relatively volatile organic solvent. The slurry is then applied to the structure, for example, by spraying or painting, and dried on the structure using a low heat, e.g., 80° to 100° C. After the slurry is dried, the structure is heated slowly, preferably at a rate of about 0.5° C. per min. or less, to a temperature whereat the resin carbonizes. For a phenolic resin, this is about 800° C. The carbonized resin bonds the glass precursors to the structure, which is then ready for overcoating with a refractory shell.

The seal coat that initially forms on the carbonous structure contains boron, plus metal or metalloid moieties, and the carbon which results from decomposition of the char-yielding material used to form the seal coat. As the seal coat is exposed to oxygen, not only do the boron and metal or metalloid progressively oxidize to boron oxide and the refractory oxide, but the carbon content of the seal coat oxidizes or "burns" away. As the carbon burns away, the volume that was occupied by the carbon in the seal coat is replaced by the increased volume of the oxides, relative to their precursors. If an outer refractory coating is applied over the seal coat, the seal coat, throughout the life of the component, will contain both precursors and an increasing amount of boron oxide-based glass.

In a preferred embodiment of the present invention, the structural material having a seal coat 14 is overcoated with the coating 16 of refractory material. This outer coating 16 must be impermeable to oxygen and other gases of comparable molecular weight because it serves to prevent ingress of oxygen and other oxidizing gases to the structural material 10. The outer coating must be sufficiently hard to protect the structural material from mechanical damage. The outer coating preferably provides a smooth outer surface that will not be affected by high-speed fluid flow. Other key requirements of an outer coating material is its ability to adhere well to the underlying seal coat 14, to be chemically unreactive with the structural material and with the seal coat at high temperatures and to be relatively easy to apply. Particularly suitable outer coatings for a $B_2O_3$-RO-protected structural materials include silicon, silicon carbide (SiC), silicon nitride ($Si_3N_4$), aluminum nitride (AlN) and silicon boride ($SiB_6$). Various metal or metalloid oxides may also be used to form the outer coating.

The outer refractor coating 16 may be applied by a number of methods as long as the deposition temperature or final heat treatment does not exceed the maximum fabrication temperature that is determined and specified for the internal sealing glass and seal coat. For example, it is possible to coat a $B_2O_3$-$ZrO_2$-protected graphite structure with a SiC shell produced from fluidized bed chemical vapor deposition (CVD) or from stationary substrate CVD. A silicon nitride shell may be produced by the method of U.S. Pat. No. 3,226,194 issued to Kuntz, the teachings of which are incorporated herein by reference.

The refractory outer coating 16 cooperates with the seal coat 14 in helping to maintain the seal coat in place on the surface of the carbonous structural material 10 and further helps to minimize vaporization of $B_2O_3$ from the seal coat. In turn, the seal coat 14 helps to maintain the barrier provided by the outer refractory coating 16 by flowing into microcracks 20 that invariably develop in the outer coating. Because the carbonous structure 10 generally has a different coefficient of thermal expansion than that of the outer refractory coating 16, the thermal expansion mismatch tends to crack the outer refractory coating even during cooling subsequent to its initial deposition and almost invariably over multiple thermal cycles.

Whereas the fillers in the carbonous matrix itself may never be exposed to oxygen and therefore remain unoxidized during the entire life of the component formed from the structural material 10, some degree of oxidation of the fillers within the seal coat 14 is expected to occur. The $B_2O_3$-RO glass, which is molten at elevated temperatures, flows into the cracks 20 which develop in the outer coating 16, sealing the same. This effect is promoted by initially providing the seal coat in the form of $B_2O_3$ and RO precursors, whereupon, as cracks develop in the outer coating 16 and oxygen seeps through, the precursors oxidize to form the glass; and the glass, having a substantially larger volume than the precursors, forces its way into the cracks of the outer refractory coating.

An important aspect of the present invention, particularly for high-temperature applications, is the inclusion of the RO in the presence of the $B_2O_3$. The mechanism for sealing and coating oxidizable structural materials to protect them from oxidation is to form the $B_2O_3$-RO glass on the pore surface and/or bulk structural surface. At high temperatures, $B_2O_3$-RO glass melts and flows to coat surfaces and to fill cracks and thus provides a barrier against oxygen ingress. Pure $B_2O_3$ glass is advantageous in this respect in that its low surface energy enhances its wetting of the surfaces of carbonous materials. However, at high temperatures, and especially at temperatures of about 1300° C. or above, the viscosity of pure $B_2O_3$-RO glass is lowered to the point where it is too fluid to remain on the surface it is to protect. Furthermore, pure $B_2O_3$ has a relatively high vapor pressure at 1300° C., and if pure $B_2O_3$ is used as a protective coating at very high temperatures, a substantial portion of the $B_2O_3$ soon vaporizes from the surfaces.

It was discovered that adding a relatively small amount of a refractory oxide precursor to the $B_2O_3$ precursor, there is formed a $B_2O_3$-refractory oxide glass system that is useful for protecting the oxidizable surfaces at high temperatures whereat pure $B_2O_3$ glass lacks sufficient viscosity. That is, at such high temperatures whereat pure $B_2O_3$ glass becomes so fluid, i.e., below about 100 poise, that it will not remain on the carbon surface, the RO dissolved in the binary glass system maintains a relatively high viscosity of the molten glass. The addition of the refractory oxide phase to the $B_2O_3$ glass suppresses the change of viscosity with temperature; i.e., it renders the mixture's viscosity relatively invariant at high temperatures. In particular, it was discovered that the following binary $B_2O_3$-RO systems are especially useful for the sealing of the pore surfaces of a carbonous structure: $B_2O_3$-$TiO_2$, $B_2O_3$-$ZrO_2$, $B_2O_3$-$HfO_2$, $B_2O_3$-$Al_2O_3$, $B_2O_3$-$Sc_2O_3$, $B_2O_3$-$La_2O_3$ (La representing any member of the lanthanide series), $B_2O_3$-$SiO_2$, and $B_2O_3$-$CeO_2$. Further, it was found that RO at between about 3 and about 25 mole percent of the $B_2O_3$ in the glass provides the viscosity-leveling property of the $B_2O_3$-RO mixture, i.e., provide a viscosity-leveled glass (VLG) that will wet and protect the pore surfaces and outer surfaces of the structure over temperature ranges from 550° to 1370° C.

The viscosity-leveling effect was discovered when a refractory phase was partially dissolved in the $B_2O_3$ glass and then observed to dissolve further as the temperature of the mixture was raised. It was found that the solution of the refractory oxide phase in the boron oxide-rich molten glass sealer leveled the viscosity and kept it within a range that permits flow of the mixture over the surface of the pores of the carbonous matrix throughout the 550°–1370° C. range.

The viscosity-leveling effect is due in large part to the increased solubility of the refractory oxide in molten boron oxide glass with increasing temperatures. FIG. 2 represents a relationship between solubility of a refractory oxide in molten boron oxide glass and temperature which holds generally true for many refractory oxides. In the graph of FIG. 2, the abscissa represents the relative mole proportions of boron oxide and refractory oxide with 100% boron oxide represented at the origin and increasing proportions of refractory oxide in mole percent to the right. Temperature is shown on the ordinate. At $T_0$, which represents the melting point of boron oxide (about 450° C.), substantially all of the liquid phase is boron oxide; however, as the temperature increases, progressively increasing amounts of the refractory oxide dissolve into the molten boron oxide-based glass. In the idealized situation represented in the graph, curved line $T_0Z$ is a plot of temperature versus refractory oxide solubility, and the amount of refractory oxide dissolved in the glass at any temperature $T_X$ can be determined by drawing a horizontal line from $T_X$ to line $T_0Z$ and dropping a vertical line from the intersection to the abscissa. In general, an increase in the proportion of refractory oxide in the molten glass tends to increase the viscosity of the molten glass, whereas an increase in temperature decreases the viscosity of the molten glass. Under certain circumstances, it has been found that the increase in dissolved refractory oxide caused by increasing temperature results in a substantial slowing of the decrease in viscosity of the molten glass, which is referred to as a viscosity-leveling effect.

The relationships between temperature, solubility of the refractory oxide and viscosity are, in actuality, somewhat more complicated due to a variety of factors. For example, whereas there is a general correspondence between increasing percentages of dissolved refractory oxide and increasing viscosity, a very small amount of dissolved refractory oxide may, in some cases, actually decrease the viscosity. At the elevated temperatures whereat boron oxide is molten, the chemical species present are not limited to the refractory oxide and boron oxide but include mixed metal or metalloid borates. Furthermore, in rapidly fluctuating temperature conditions, equilibrium conditions are seldom seen, and the boron oxide melt is more often either supersaturated or unsaturated.

Furthermore, the flow characteristics of the molten boride-based glass with the dissolved refractory oxide is not a function of the viscosity of the molten phase alone. In providing the viscosity-leveled glass protection in accordance with the present invention, the refractory oxide is almost always provided in amounts sufficient so that throughout the intended use temperature range of the composite, some refractory oxide remains undissolved. Accordingly, with the refractory oxide in excess, the binary system includes both a liquid phase, i.e., molten glass, and undissolved crystals which reduce the flowability of the liquid phase.

Because of multiple factors that affect viscosity, the viscosity characteristics must be determined empirically for each boron oxide-refractory oxide binary system of a particular refractory oxide at a particular mole percent. Generally, the refractory oxide selected and the optimal mole percent must be determined for a particular use temperature range of the structure. The refractory oxide must adequately stabilize the viscosity within the use temperature range, assuring that the viscosity does not drop below about 100 poise, as measured by the torsional vibrational technique, or else the melt will tend to flow off of the carbonous surfaces and fail to protect the carbonous material from oxidation.

The percentage of refractory oxide must be above a lower threshold limit because, as noted above, small percentages of refractory oxide may actually reduce the viscosity and because it is desirable to provide enough refractory oxide so that some refractory oxide will remain in solid phase throughout the use temperature range.

On the other hand, excessive quantities of refractory oxide are to be avoided because too large quantities of undissolved refractory oxide will excessively reduce the wettability and flowability of the glass, which may cause structure-weakening strain on the structure during thermal cycling. It is preferred that throughout the temperature range from where the boron oxide first begins to liquify through the uppermost temperature to which the structure is to be subjected, the viscosity of the glass does not exceed about $10^7$ poise.

Another consideration in determining suitability of a binary system is chemical stability of the system. The ultimate use temperature for a carbonous structure which is protected by a refractory oxide-stabilized boron oxide-based glass is about 1500° C. due to preferential carbothermic reduction of the boron oxide within the matrix. Certain binary systems, however, become chemically unstable at lower temperatures, for example, a $B_2O_3$-$TiO_2$ system.

A further consideration in determining stability of a binary system is the ability of the refractory oxide-stabilized glass to wet the carbon surfaces. If the wetting angle becomes too high, the molten phase will tend to bead up on the surfaces of the carbonous structure and fail to adequately protect the same from oxidation. To assure adequate protection by the binary glass system, the wetting angle of the molten glass should be low (about 90° or less) throughout the use temperature range. The use temperature of $B_2O_3$-$Al_2O_3$, for example, is limited to that at which about 6% $Al_2O_3$ is fully dissolved in $B_2O_3$ because at higher $Al_2O_3$ percentages the melt fails to adequately wet the carbon surfaces.

Although insufficient wetting of the carbononous surfaces may be a problem with certain binary systems, silicon, silicon carbide, silicon nitride, aluminum nitride and silicon boride are readily wet by any of the contemplated binary systems of the present invention. Thus, the molten $B_2O_3$-RO glasses adhere well to the interior surface of the outer coating 16 and also flow readily into any microcracks in the outer coating.

With the above-described considerations in mind, it can be appreciated that the temperature range of viscosity-leveling of a binary system is dependent upon the choice of refractory oxide, by the mole percent of the refractory oxide, and by the ultimate intended use temperature of the composite structure. $B_2O_3$-$ZrO_2$ and $B_2O_3$-$HfO_2$ systems exhibit good high temperature (1200°–1400° C.) sealing, stability and viscosity behavior while for low to moderate temperatures, i.e., 900°–1200° C., $B_2O_3$-$TiO_2$ glasses exhibit useful properties. The $B_2O_3$-$Al_2O_3$ system works well for a low-temperature regime (550°–900° C.), but its ability to wet carbonous surfaces diminishes with increasing percentages of $Al_2O_3$. The $B_2O_3$-(Sc, Y, La)$_2O_3$ systems also work to inhibit the oxidation of carbonous structures. However, the optimal temperature ranges of these binary systems are not as fully worked out.

While the invention is frequently described herein in terms of binary $B_2O_3$-RO glass sealant systems, a mixture Of mOre than One RO with the $B_2O_3$ may prove to be useful in certain structural material applications; however, the viscosity leveling relationships of such systems would be significantly more complicated.

The choice of final heat treatment temperature for matrix densification (graphitization) in a composite is governed by the interaction between the fibers, carbonous matrix, and the oxidation-inhibitor particulates. The optimum heat treatment temperature is one which maximizes the interaction between the oxidation-inhibitor particulate phase (fillers) and the carbonous matrix while minimizing the interaction between the inhibitor and the fiber. To determine the optimum heat treatment temperature, the structure containing the precursor particulates is first heated to about 800° C. in an inert atmosphere to carbonize the char-yielding material and drive off most of the volatiles. Further heating is done in a dilatometer to determine the temperature whereat the reaction of the fillers and the matrix occurs. Determination of the filler-matrix interaction temperature is required for each filler system, and this temperature limits the final heat treatment of the structure during manufacture. For example, the maximum heat treatment for the sealer system $B_2O_3$-$ZrO_2$ is determined to be 1700° C. Avoiding interaction between the filler materials and the matrix and fibers prevents degradation of the fibers and ensures that the highest strength of the composite will be retained.

An important advantage of providing the RO precursor in addition to the $B_2O_3$ precursor is that $B_2O_3$ has a relatively high vapor pressure at elevated temperatures, particularly in the presence of water vapor, and it was further discovered that the ROs, such as those listed above, reduce the high-temperature vapor pressure of molten $B_2O_3$ glass. This presents a further consideration in selecting a suitable binary system for a use temperature range, because the refractory oxide should sufficiently lower the vapor pressure of $B_2O_3$ to prevent excess vaporization thereof during the life of the component formed from the structural material.

Refractory oxides generally tend to reduce the chemical activity of $B_2O_3$ both with water vapor and with carbon, thereby increasing the chemical and thermodynamic stability of the glass when in contact with the fibers, e.g., carbon fibers, and carbonous matrix as well as with other materials that may be optionally added to the structural material.

An additional advantage of providing the RO in conjunction with $B_2O_3$ is establishing high-temperature, long-term chemical compatibility with the outer refractory coating. For example, it has been found that during long-term, high-temperature exposures in air, $B_2O_3$ will dissolve portions of a silicon-containing outer coating (e.g., Si, SiC or $Si_3N_4$) if silicon is not initially present as $SiO_2$ along with the $B_2O_3$. Such detrimental chemical interactions with the outer refractory coating can be minimized by selecting a $B_2O_3$ sealer system with an RO addition in which the R cation matches that of the outer refractory coating. This equilibrates the cation chemical activity of the outer coating with the seal coat, and thus, removes the driving force for chemical interaction. Examples of this include $SiO_2$ as the RO in conjunction with silicon, SiC or $Si_3N_4$ outer coatings and $Al_2O_3$ as the RO in conjunction with AlN as the outer coating.

In a preferred embodiment, a silicon oxide precursor is added to both the composite and/or the seal coat (preferably both) in addition to a precursor of one of the other above-described refractory oxides to produce, after oxidation, a ternary glass consisting of boron oxide, silicon oxide, and a refractory oxide viscosity leveller. The addition of silicon oxide to the boron oxide results in a borosilicate glass which offers some advantages over a boron oxide glass-based sealant. Boron oxide-based glasses are known to be readily attacked by water, whereas borosilicate glasses are more resistant to attack. In addition, at a given temperature, the vapor pressure of silicon oxide is lower than that of boron oxide. Using a borosilicate glass-based sealant in place of a boron oxide glass-based sealant lowers the vapor pressure of boron oxide and reduces its rate of evaporation.

In this embodiment, the amounts of precursors added to the matrix-forming, carbon char-yielding material are such that in the borosilicate glass, the silicon, calculated as silicon oxide, is present in amounts of from about 3 to about 40 mole percent of the borosilicate, calculated as boron oxide plus silicon oxide, and preferably from about 4 to about 25 mole percent. The metal or metalloid, calculated as the corresponding refractory oxide, is present in amounts of from about 3 to about 50 mole percent of the borosilicate, calculated as boron oxide plus silicon oxide, and preferably from about 4 to about 25 mole percent.

The invention will now be described in greater detail by way of specific examples which are intended to exemplify but not to limit the scope of the present invention.

EXAMPLE 1

43.3 w/o $ZrB_2$ was mixed with 56.7 w/o boron powder. This ratio of particulates transforms upon complete oxidation to a composition with a 86:14 molar ratio $B_2O_3$-$ZrO_2$ mix. This molar ratio is presently considered optimal for providing viscosity-leveling in a $B_2O_3$-$ZrO_2$ binary system. Three parts by weight of SC-1008 phenolic resin obtained from Monsanto, Chemicals, St. Louis were mixed with two parts by weight of the boron and $ZrB_2$ particulates in a high shear mixer to achieve homogeneity. This mix was then painted onto conventional carbon fiber cloth (T-300 PAN fibers) and the excess mix was removed with a flexible rubber roller, forming plies. The impregnated plies were then heated to 80° C. for 15–20 minutes to partially cure the resin and render the plies convenient to handle. The individual plies were laid up to form a composite and loaded into a press with heated platens. The composite received the following heat/press schedule:

| Temperature Range (°C.) | Pressure Range (kg/cm$^2$) | Time (hr) |
| --- | --- | --- |
| 22–80 | 17.5 | 1 |
| 80–90 | 17.5–53 | 1 |
| 90–180 | 53 | 1 |
| 180–200 | 53 | 1 |

The composites were then packed in sand and carbonized in an inert atmosphere in a retort furnace. The composites were slowly heated to 500° C., rapidly to 800° C. and then cooled.

Next, stabilization or high-temperature processing was performed in an inert atmosphere at 1700° C. for one hour. After cooling, the composites were given three impregnation, carbonization, graphitization cycles using the phenolic resin alone as an impregnant.

Using this processing, an inhibitor loading level of approximately 65 weight percent of the carbon in the composite is realized for the inhibitor system calculated as the $ZrO_2$ and $B_2O_3$. This composite also contained from 10 to 20 volume percent porosity. At this inhibitor loading level, upon oxidation, there is ample $B_2O_3$-RO precursors to ultimately fill in all of the accessible matrix and interfiber porosity.

At this time the composite is machined into a block $2''\times\frac{1}{4}''\times\frac{1}{4}''$.

100 gm of the phenolic resin used above was dissolved in 150 ml of ethyl alcohol, and a slurry is formed adding 43 gm of $ZrB_2$ and 56 gm of powdered boron. Approximately 0.250 gm of slurry was painted onto the structure produced above, which had a surface area of about $2\frac{1}{8}$ in². The structure was then dried for one hour at 100° C. Next, the structure was placed in an inert atmosphere and heated at a rate of about 0.5° C. per min. to 800° C., and maintained at 800° C. for 30 min., and cooled slowly.

The structure was overcoated by chemical vapor deposition with a 200 micron thick layer of silicon carbide.

The coated carbon-carbon composite structure was tested for various mechanical properties, and the results are given in Table 1 below:

TABLE 1

| Property | Value | Test Method |
|---|---|---|
| Flexural Strength | 1900 kg/cm² | 4 PT 7:1 span to depth beam |
| Young's modulus | $8 \times 10^5$ kg/cm² | 4 PT 25:1 span to depth beam |
| Fracture strain | 0.29% | 4 PT 25:1 span to depth beam |
| Calc shear stress maximum unoxidized | 56.0 kg/cm² | 4 PT 7:1 span to depth beam |
| Calc shear stress, maximum 50-hr, oxidized, coated | 105 kg/cm² | 4 PT 7:1 span to depth beam |

These results show that the carbon-carbon composites coated for oxidation inhibition retain the desirable mechanical characteristics of raw carbon-carbon composites.

The carbon-carbon composite was tested for oxidation resistance by temperature cycling in the presence of air continuously for 1000 hours, repeating 500 times a two-hour cycle in which the composite was maintained at 650° C. for $\frac{1}{2}$ hour, raised to 1350° C. during a second $\frac{1}{2}$ hr., maintained a 1350° C. for a third $\frac{1}{2}$ hr., and lowered to 650° C. during the final $\frac{1}{2}$ hr. During about the first 20 hours, the weight of the composite increased continuously up to about $2\frac{1}{2}$ percent above the starting weight, this weight gain presumably representing the oxidation of $ZrB_2$ and B to form the binary $B_2O_3$-$ZrO_2$ system. After this initial weight rise, no further weight change was seen over the 1000 hr. cycling time, indicating that no further oxidation of the precursors occurred. Also, no weight loss was seen, indicating that the carbon was not oxidizing. The mechanical properties of the carbon-carbon composite after the 1000 hr. cycle were substantially unchanged.

EXAMPLE 2

To demonstrate the viscosity leveling effect of a refractory oxide on molten $B_2O_3$ glass, an 88 mole % $B_2O_3$, 12 mole % $ZrO_2$ mixture was prepared. The mixture was heated to 1400° C., whereat the $B_2O_3$ fused to a molten glass and the $ZrO_2$ was partially dissolved therein, and then the glass was cooled to solidify the same.

The glass was again heated slowly until melting began at just over 500° C., and the viscosity in poise was measured by the torsional vibration technique which uses a vibrating sphere viscometer. The glass continued to be heated with viscosity measurements taken at various temperatures. The semi-log graph of FIG. 3 illustrates the results of these measurements. The solid line represents the measure of the viscosities at the various temperatures. The broken line represents the relationship of viscosity and temperature of a pure single phase glass that follows Arrhenius law, which is expressed in the formula:

$$n = n_o \exp^{-(E_{ACT}/RT)} \text{ where;}$$
n is the actual viscosity;
$n_o$ is the preexponential viscosity;
$E_{ACT}$ is activation energy (KJ/mole);
R is the gas constant; and
T is temperature.

The broken line determined by the Arrhenius law equation is straight in this plot which relates reciprocal temperature to log viscosity. It can be seen from the graph that at about 800° C. and upwards, whereas a pure glass would tend to continue to decrease in viscosity, the viscosity of the binary system levels off at about 100 poise.

EXAMPLE 3

The resinous dispersion of $ZrB_2$ and boron powder in phenolic resin used to form the matrix in Example 1 is mixed on an equal weight basis with whiskers of fibers of the following: silicon carbide, silicon nitride, zirconium carbide, hafnium carbide and tantalum carbide. Likewise, unfilled phenolic resin is mixed on an equal weight basis with each of the fibers.

The separate materials are individually loaded into a press with heated platens and receive the heat/press schedule described in Example 1. Under the conditions set forth in FIG. 1, the materials are first carbonized and subsequently graphatized. In each case, the carbonized material is machined into a block $2''\times\frac{1}{4}''\times\frac{1}{4}''$.

Each block is supported along a $\frac{1}{4}''$ segment at each end. The center of the unsupported $1\frac{1}{2}$ span is increasingly weighted until the block breaks. In the case of each fiber, the block having the oxidation-inhibiting fillers supports an equal or greater weight.

EXAMPLE 4

34.5 w/o $ZrB_2$ was mixed with 54.1 w/o boron carbide powder and 11.4 w/o $SiB_6$. This ratio of particulates transforms upon complete oxidation to a composition with a 4:10:86 molar ratio $SiO_2$:$ZrO_2$:$B_2O_3$ mix. This molar ratio is presently considered optimal for providing viscosity-leveling in a $SiO_2$-$ZrO_2$-$B_2O_3$ ternary system. Three parts by weight of SC-1008 phenolic resin obtained from Monsanto, Chemicals, St. Louis were mixed with two parts by weight of the $ZrB_2$-$B_4C$-$SiB_6$ particulates in a high shear mixer to achieve homogeneity. This mix was then painted onto conventional carbon fiber cloth (T-300 PAN fibers) and the excess mix was removed with a flexible rubber roller, forming plies. The impregnated plies were then heated to 93° C. for 5 minutes to partially cure the resin and render the plies convenient to handle. The individual plies were laid up to form a composite and loaded into a press with heated platens. The composite received the following heat/press schedule:

| Temperature Range (°C.) | Pressure Range (kg/cm²) | Time (hr) |
|---|---|---|
| 22-93 | 17.5 | 0.5 |
| 93 | 17.5 | 1 |

-continued

| Temperature Range (°C.) | Pressure Range (kg/cm²) | Time (hr) |
|---|---|---|
| 93–120 | 17.5 | 1 |
| 120–163 | 17.5 | 1 |
| 163 | 17.5 | 1 |

The composites were then packed in sand and carbonized in an inert atmosphere in a retort furnace. The composites were heated to 500° C. in 40 hours, heated to 800° C. in 6 hours, and then cooled.

Next, stabilization or high-temperature processing was performed in an inert atmosphere at 1650° C. for one hour. After cooling, the composites were given four impregnation, carbonization, graphitization cycles using a furaldehyde-resorscinol resin as an impregnant.

100 gm of the phenolic resin used above was dissolved in 150 ml of isopropyl alcohol, and a slurry is formed adding 23 gm of $ZrB_2$ and 36 gm of powdered boron carbide, and 7.6 gm of $SiB_6$. Slurry was painted onto the structure produced above. The structure was then dried for one hour at 100° C. Next, the structure was placed in an inert atmosphere and heated at a rate of about 5° C. per min. to 800° C., and maintained at 800° C. for 30 min., and cooled slowly.

The carbon-carbon composite structure was tested for various physical and mechanical properties, and the results are given in Table 4 below:

TABLE 4

| Property | Value | Rest Method |
|---|---|---|
| Bulk Density | 1.79 g/cm³ | ASTM-C20 |
| Apparent Porosity | 4% | ASTM-C20 |
| Short-Beam Shear Strength | 2463 psi | ASTM-D2344 |

By comparison, a carbon-carbon panel, made without inhibitor but with other fabrication details the same as given above, had a measured shear strength of 1518 psi. The results show that carbon-carbon composites containing ternary Zr-Si-B inhibitor systems can have mechanical properties superior to uninhibited carbon-carbon.

EXAMPLE 5

9.7 w/o $AlB_2$ was mixed with 22.6 w/o SiC and 67.7 w/o $B_4C$. This ratio of particulates transforms upon complete oxidation to a composition with a 3:17:80 molar ratio of $Al_2O_3:SiO_2:B_2O_3$ mix. This molar ratio is presently considered optimal for providing viscosity levelling in a $Al_2O_3$-$SiO_2$-$B_2O_3$ ternary system. Three parts by weight of SC-1008 phenolic resin (Monsanto Chemicals, St. Louis) were mixed with two parts by weight of the $AlB_2$-SiC-$B_4C$ particulate mix.

This mix was then painted onto conventional carbon fiber cloth (T-300 PAN fibers) and the excess mix was removed with a flexible rubber roller, forming plies. The impregnated plies were then heated to 93° C. for 5 minutes to partially cure the resin and render the plies convenient to handle. The individual plies were laid up to form a composite and loaded into a press with heated platens. The composite received the following heat-/press schedule:

| Temperature Range (°C.) | Pressure Range (kg/cm²) | Time (hr) |
|---|---|---|
| 22–93 | 17.5 | 0.5 |

-continued

| Temperature Range (°C.) | Pressure Range (kg/cm²) | Time (hr) |
|---|---|---|
| 93 | 17.5 | 1 |
| 93–120 | 17.5 | 1 |
| 120–163 | 17.5 | 1 |
| 163 | 17.5 | 1 |

The composites were then packed in sand and carbonized in an inert atmosphere in a retort furnace. The composites were heated to 500° C. in 40 hours, heated to 800° C. in 6 hours, and then cooled.

Next, stabilization or high-temperature processing was performed in an inert atmosphere at 1650° C. for one hour. After cooling, the composites were given four impregnation, carbonization, graphitization cycles using a furaldehyde-resorscinol resin as an impregnant.

100 gm of the phenolic resin was dissolved in 150 ml of isopropyl alsochol and a slurry formed by adding 6.5 gm of $AlB_{12}$, 15.1 gm. SiC, and 45.1 gm. $B_4C$. Slurry was painted onto the structure produced above and dried for 1 hour at 100° C. Next, the structure was placed in an inert atmosphere and heated at a rate of about 5° C. per min. to 800° C., and maintained at 800° C. for 30 minutes.

The carbon-carbon composite structure was tested for various physical and mechanical properties, and the results are given in Table 5 below:

TABLE 5

| Property | Value | Test Method |
|---|---|---|
| Bulk Density | 1.78 g/cm³ | ASTM C-20 |
| Apparent Porosity | 3.8% | ASTM C-20 |
| Short-Beam Shear Strength | 2776 psi | ASTM D-2344 |

By comparison, a carbon-carbon panel made without inhibitor but with other fabrication details the same as given above had a measured shear strength of 1518 psi. The results show that carbon-carbon composites containing Al-Si-B ternary inhibitor systems can have mechanical properties superior to uninhibited carbon-carbon.

EXAMPLE 6

A mixture of $AlB_{12}$, and SiC in the molar ratio Al:B:Si = 3:36:1 was added to SC-1008 phenolic resin at a level of approximately 7% by weight. The mix was prepregged into a thermally stabilized eight harness section weave T-300 carbon cloth. Laminated panels were laid up and debulked in vacuum at 70°–82° C. The panels were cured in an autoclave at 100 psi to 177° C., followed by a heat treatment of 219° C. A repeated sequence of three cycles of impregnation with pitch-furfural resin mixture, followed by carbonization to 525° C. and graphitization to 1650° C., was used to densify the panels.

94.4 w/o was mixed with 5.6 w/o of silicon. 2 parts by weight of the particulate mix was added to 3 parts by weight of SC-1008 phenolic resin and 3 parts by weight of methyl alcohol to form a slurry. The slurry was painted onto the structure produced above. After drying at 100° C. for 1 hour, the coating was carbonized in an inert atmosphere at 800° C. The structure was overcoated with 0.003 in. chemical vapor deposited silcon carbide.

Small coated specimens were oxidized on a microbalance in flowing air at 1000° C. After 25 hours, the specimen weight loss was 3 w/o and the weight loss rate had slowed to 0.08 w/o per hour.

A large coated panel of the structure was oxidized under cyclic conditions in air between room temperature and 1200° C. to a weight loss of 1.17 w/o. Flexural tests (both long and short beams) were conducted on specimens cut from the oxidized material and unoxidized companions. The following results were obtained:

| Property | Pre-oxidation Value | Post-oxidation Value |
|---|---|---|
| Flexural Strength (KSI) | 22.7 | 23.7 |
| Young's Modulus (MSI) | 11.3 | 11.2 |
| Short-Beam Shear Strength (psi) | 1337 | 1147 |

These results show that carbon-carbon composites containing a ternary inhibitor system and coated with silicon carbide had good resistance to oxidation and after exposure to an ozidizing atmosphere their mechanical properties were changed only slightly.

EXAMPLE 7

To demonstrate the viscosity leveling effect of a refractory oxide on molten borosilicate glass, an 86 mole % $B_2O_3$, 4 mole % $SiO_2$, 10 mole % $ZrO_2$ mixture was prepared. The mixture was heated to 1400° C., whereat the $B_2O_3$ and $SiO_2$ fused to a molten glass and the $ZrO_2$ was partially dissolved therein, and then the glass was cooled to solidify the same.

Figure 4:
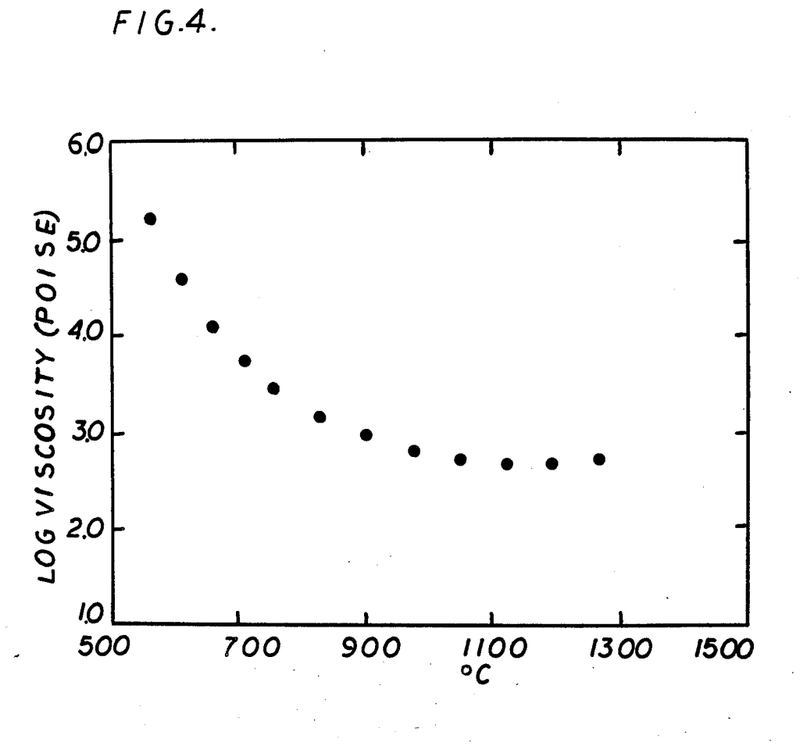
FIG. 4 is a semi-log graph showing the viscosity levelling effect of $ZrO_2$ on borosilicate glass, with viscosity in poise being shown on the logarithmic ordinate and temperature in °C. being shown on the abscissa.

The glass was again heated slowly until melting began, and the viscosity in poise was measured by the torsional vibration technique which uses a vibrating sphere viscometer. The glass continued to be heated with viscosity measurements taken at various temperatures. The semi-log graph of FIG. 4 illustrates the results of these measurements. The points represent the measure of the viscosities at the various temperatures. It can be seen from the graph that at about 900° C. and upwards, whereas a pure glass would tend to continue to decrease in viscosity, the viscosity of the binary system levels off at about 500 poise.

It may now be seen that the invention provides improved carbonous structural materials with improved oxidization resistance. Oxidization-resistant composites formed in accordance with the invention have mechanical strengths that compare favorably to composites formed in a similar manner but not formed and treated to be oxidation-resistant. By incorporating the $B_2O_3$-RO glass into the matrix of the structure, coating the structure with an additional $B_2O$-RO seal coat and overlaying a refractory outer coating around the structure, oxidizing attack on the carbon of the structure is substantially eliminated. An additional, unexpected advantage of the structural materials of the present invention is that reaction of the metallic boron with the matrix during fabrication of the composite tends to increase the interlaminar shear strength of the composite structure.

While the invention has been described in terms of certain preferred embodiments, modifications obvious to one with ordinary skill in the art may be made without departing from the scope of the present invention.

Although it is highly preferred in most applications to provide both $B_2O_3$-RO glass precursors in the carbonous matrix for the purpose of coating internal pore surfaces as well as a seal coat of $B_2O_3$-RO glass precursors for the purpose of protecting the structural surface and pores that open thereto, it is to be understood that the internal fillers and the seal coat each contribute individually to oxidation protection. Thus, in addition to structural materials having both forms of protection, the invention is intended to encompass structures having either form of protection, individually.

The invention has been described herein primarily in terms of refractory oxides having increasing solubility in $B_2O_3$ glass with increasing temperature, whereby the RO stabilizes viscosity through a temperature range. However, refractory oxides which have sufficient solubility throughout a temperature range, for example, refractory oxides that are completely miscible with molten $B_2O_3$ glass, may be used to maintain the viscosity above about $10^2$ poise throughout a temperature range to which the composite component will be subjected. Preferably the refractory oxide between the melting temperature ($T_0$) of $B_2O_3$ and the highest temperature at which the component will be used does not at any point increase the viscosity of the $B_2O_3$ glass above about $10^7$ poise. Again, the wetting angle of the binary glass system, from the melting temperature of $B_2O_3$ to the highest use temperature of the composite component, should remain under 90°.

Various features of the invention are set forth in the following claims.

What is claimed:

1. An oxygen-resistant, high-temperature structure comprising
    a carbonous structural matrix formed with interstices throughout,
    boron, in elemental form and/or as moiety of a compound, said boron being dispersed throughout said matrix, silicon in elemental form and/or as a moiety of a compound, said silicon being dispersed throughout said matrix, plus an additional metal or metalloid, in elemental form and/or as a moiety of a compound, said metal or metalloid being dispersed throughout said matrix,
    said boron, said silicon and said additional metal or metalloid each oxidizing when exposed to a high-temperature, oxidizing environment to form borosilicate plus a metal oxide or a metalloid oxide within the interstices and at the surface of said matrix;
    the boron plus silicon plus said additional metal or metalloid, calculated as if in their fully oxidized forms, comprising between about 10 about 1000 weight percent of the carbon in said matrix, said silicon oxide, calculated as a silicon oxide, being present in amounts of from about 3 to about 40 mole percent of silicon plus boron, calculated as silicon oxide plus boron oxide, said metal or metalloid, calculated as if fully oxidized, being present in an amount of from about 3 to about 50 mole percent of boron plus silicon, calculated as boron oxide plus silicon oxide;
    at high temperatures, the metal oxide or metalloid oxide which forms stabilizing the viscosity of the molten phase of the borosilicate which forms.

2. An oxygen-resistant, high-temperature composite comprising
    a structure which includes a carbonous matrix formed with interstices throughout and reinforcing, high-temperature fibers disposed within said matrix, boron, in elemental form and/or as moiety of a compound, said boron being dispersed throughout said matrix, silicon in elemental form and/or as a moiety of a compound, said silicon being dispersed throughout said matrix, plus an additional metal or metalloid, in elemental form and/or as a moiety of a compound, said metal or metalloid being dispersed throughout said matrix, said boron, said silicon plus said additional metal or metalloid each oxidizing when exposed to a high-temperature, oxidizing environment to form borosilicate plus a metal oxide or a metalloid oxide within the interstices and at the surface of said matrix, the boron plus silicon plus said additional metal or metalloid, calculated as if in their fully oxidized forms, comprising between about 10 about 1000 weight percent of the carbon in said matrix, said silicon, calculated as silicon oxide, being present in amounts of from about 3 to about 40 mole percent of silicon plus boron, calculated as silicon oxide plus boron oxide, said metal or metalloid, calculated as if fully oxidized, being present in an amount of from about 3 to about 50 mole percent of boron plus silicon, calculated as boron oxide plus silicon oxide;

at high temperatures, the metal oxide or metalloid oxide which forms stabilizing the viscosity of the molten phase of the borosilicate which forms.

3. An oxygen-resistant composite according to claim 2 in combination with an outer refractory coating.

4. An oxygen-resistant composite according to claim 2 having a seal coat covering the structural surfaces of said composite, said seal coat containing boron, silicon and an additional metal or metalloid, said boron, silicon and additional metal or metalloid of said seal coat each oxidizing in a high-temperature, oxidizing environment to further protect said composite from oxidation.

5. A composite according to claim 4 in combination with an outer refractory coating that covers said composite structure and said seal coat.

6. A composite in accordance with claim 2 wherein said additional metal or metalloid is selected from the group consisting of Ti, Zr, Hf, Al, Y, Sc, La, and Ce.

7. A method of preparing a high-temperature, oxygen-resistant carbonous structure comprising in a carbon char-yielding material, dispersing boron, in elemental form and/or as a moiety of a compound, dispersing silicon in elemental form and/or as a moiety of a compound and also dispersing an additional metal or metalloid, in elemental form and/or as a moiety of a compound, and heating said char-yielding material to carbonize the same and thereby form a carbonous matrix, said boron, silicon and additional metal or metalloid being dispersed in amounts within said char-yielding material such that in said carbonous matrix that forms, the boron plus silicon plus additional metal or metalloid, calculated as if in their fully oxidized forms, comprise between about 10 about 1000 weight percent of the carbon in said matrix, said silicon, calculated as silicon oxide, being present in amounts of from about 3 to about 40 percent of silicon plus boron, calculated as silicon oxide plus boron oxide, said metal or metalloid, calculated as if fully oxidized, being present in an amount of from about 3 to about 50 mole percent of boron plus silicon, calculated as boron oxide plus silicon oxide, said boron, silicon and additional metal or metalloid each oxidizing when exposed to a high-temperature, oxidizing environment to form borosilicate and a metal oxide or a metalloid oxide within the interstices and at the surface of said matrix; at high temperatures the metal oxide or metalloid oxide which forms stabilizing the viscosity of the molten phase of the borosilicate which forms.

8. A method of preparing a high-temperature, oxygen-resistant composite comprising in a carbon char-yielding material, dispersing boron, in elemental form and/or as a moiety of a compound, dispersing silicon in elemental form and/or as a moiety of a compound, dispersing silicon in elemental form and/or a moiety of a compound and also dispersing an additional metal or metalloid, in elemental form and/or as a moiety of a compound, impregnating reinforcing, high-temperature fibers with said dispersion, forming a three-dimension structure with said dispersion-impregnated fibers, and heating said three-dimensional structure to carbonize said char-yielding material and thereby form a carbonous structure in which a carbonous matrix is reinforced by said fibers, said boron, silicon and metal or metalloid being dispersed in amounts within said char-yielding material such that in said carbonous matrix that forms, the boron plus silicon plus additional metal or metalloid, calculated as if in their fully oxidized forms, comprise between about 10 about 1000 weight percent of the carbon in said matrix, said silicon, calculated as silicon oxide, being present in amounts of from about 3 to about 40 mole percent of silicon plus boron, calculated as silicon oxide plus boron oxide, said metal or metalloid, calculated as if fully oxidized, being present in an amount of from about 3 to about 50 mole percent of boron plus silicon, calculated as boron oxide plus silicon oxide, said boron, silicon and additional metal or metalloid each oxidizing when exposed to a high-temperature, oxidizing environment to form borosilicate and a metal oxide or a metalloid oxide within the interstices and at the surface of said carbonous structure; at high temperatures the metal oxide or metalloid oxide which forms stabilizing the viscosity of the molten phase of the borosilicate which forms.

9. A method of protecting a high-temperature structure from oxidation comprising dispersing, in a carbon char-yielding material, boron, silicon and an additional metal or metalloid, each in either elemental form and/or as a moiety of a compound, said silicon, calculated as silicon oxide, being present in amounts of from about 3 to about 40 mole percent of silicon plus boron, calculated as silicon oxide plus boron oxide, said additional metal or metalloid, calculated as if fully oxidized, being present in an amount of from about 3 to about 50 mole percent of boron plus silicon, calculated as boron oxide plus silicon oxide, applying said dispersion to surfaces of said structure, and carbonizing said char-yielding material thereon to form a seal coat, the boron, silicon and additional metal or metalloid in said seal coat ultimately oxidizing in a high-temperature, oxidizing environment to form borosilicate and metal oxide or metalloid oxide;

at high temperatures, the metal oxide or metalloid oxide that forms stabilizing the viscosity of the molten phase the borosilicate that forms.

10. An oxygen-resistant, high-temperature composite comprising a structure which includes a carbonous matrix formed with interstices throughout and reinforcing, high-temperature carbon fibers disposed within said matrix, a metal or metalloid, in elemental form and/or as a moiety of a compound, dispersed throughout said structure, and boron, dispersed throughout said structure as a moiety of boron carbide, said boron and said metal or metalloid oxidizing when exposed to a high-temperature, oxidizing environment to form boron oxide and a metal oxide or a metalloid oxide within the interstices and at the surface of said matrix, the boron plus metal or metalloid, calculated as if in their fully oxidized forms, comprising between about 10 about 1000 weight percent of the carbon in said matrix, said metal or metalloid, calculated as if fully oxidized, being present in an amount of from about 3 to about 25 mole percent of boron, calculated as boron oxide;

at high temperatures, the metal oxide or metalloid oxide which forms stabilizing the viscosity of the molten phase of the boron oxide which forms.

* * * * *

UNITED STATES PATENT AND TRADEMARK OFFICE
CERTIFICATE OF CORRECTION

PATENT NO. : 4,892,790
DATED : January 9, 1990
INVENTOR(S) : Paul Edward Gray

It is certified that error appears in the above-identified patent and that said Letters Patent is hereby corrected as shown below:

Column 1, line 8,
insert--The Government has rights in this invention pursuant to Contract No. F33615-83-C-5130 awarded by the United States Department of the Air Force.--

Column 10, line 20,
delete "$B_2O_3$-RO" and insert --$B_2O_3$--.

Column 10, line 43,
after "$B_2O_3$-$Al_2O_3$, insert --$B_2O_3$-$Y_2O_3$,--.

Column 18, line 58,
after "w/o" insert --$AlB_{12}$--.

Column 21, line 64,
after "40" insert --mole--.

Signed and Sealed this

Twelfth Day of November, 1991

Attest:

HARRY F. MANBECK, JR.

*Attesting Officer*   *Commissioner of Patents and Trademarks*